US008223821B2

(12) United States Patent
Hannan et al.

(10) Patent No.: US 8,223,821 B2
(45) Date of Patent: Jul. 17, 2012

(54) UPLINK SIGNAL DETECTION IN RF REPEATERS

(75) Inventors: Ariful Hannan, Sterling, VA (US); John Carlson, Dulles, VA (US)

(73) Assignee: Andrew LLC, Hickory, NC (US)

(*) Notice: Subject to any disclaimer, the term of this patent is extended or adjusted under 35 U.S.C. 154(b) by 579 days.

(21) Appl. No.: 12/491,371

(22) Filed: Jun. 25, 2009

(65) Prior Publication Data

US 2010/0329311 A1 Dec. 30, 2010

(51) Int. Cl.
*H04L 25/20* (2006.01)
(52) U.S. Cl. ......... 375/211; 375/141; 375/147; 375/340
(58) Field of Classification Search .................. 375/150, 375/152, 211, 214, 219, 324, 340, 343, 345
See application file for complete search history.

(56) References Cited

U.S. PATENT DOCUMENTS

| | | | |
|---|---|---|---|
| 5,222,104 A | 6/1993 | Medendorp | |
| 5,862,460 A | 1/1999 | Rich | |
| 6,055,431 A | 4/2000 | Dybdal | |
| 6,088,384 A | 7/2000 | Hindman | |
| 6,609,008 B1 | 8/2003 | Whang | |
| 6,728,299 B2 | 4/2004 | Jung et al. | |
| 6,741,638 B2 | 5/2004 | Ramberg et al. | |
| 6,807,405 B1 | 10/2004 | Jagger et al. | |
| 6,873,664 B1 * | 3/2005 | Clark | 375/340 |
| 6,873,823 B2 | 3/2005 | Hasarchi | |
| 6,889,033 B2 | 5/2005 | Bongfeldt | |
| 7,013,160 B2 | 3/2006 | Tiedemann, Jr. et al. | |
| 7,050,758 B2 | 5/2006 | Dalgleish | |
| 7,058,400 B2 | 6/2006 | Brooks | |
| 7,061,891 B1 | 6/2006 | Kilfoyle et al. | |
| 7,061,967 B2 | 6/2006 | Schelm et al. | |
| 7,096,035 B2 | 8/2006 | Gouessant | |
| 7,171,252 B1 | 1/2007 | Scarantino et al. | |
| 7,206,336 B1 | 4/2007 | Rog | |
| 7,233,771 B2 | 6/2007 | Proctor, Jr. | |

(Continued)

FOREIGN PATENT DOCUMENTS

WO WO9943100 8/1999

(Continued)

OTHER PUBLICATIONS

Sixteen-page International Search Report and Written Opinion mailed Mar. 16, 2011 for PCT/US2010/028469.

(Continued)

*Primary Examiner* — Dac Ha
(74) *Attorney, Agent, or Firm* — Wood, Herron & Evans, LLP (57) ABSTRACT

A method for detecting an IS-95 signal without knowledge of a spreading code for the IS-95 signal is provided. A received baseband signal is rotated through a plurality of phase-shifts. For each phase-shifted baseband signal, an in-phase component or a quadrature component of the phase-shifted baseband signal is realigned. The in-phase and quadrature components are multiplied by a PN short code to partially despread the components. The partially despread in-phase and quadrature components are multiplied and integrated. The integrated despread in-phase and quadrature components are compared to a threshold value. In response to exceeding the threshold value, the received baseband signal is identified as an IS-95 signal. The method may be implemented on a repeater for repeating signals between multiple sources.

20 Claims, 5 Drawing Sheets

U.S. PATENT DOCUMENTS

| | | | |
|---|---|---|---|
| 7,266,103 B2 | 9/2007 | Anderson et al. | |
| 7,333,563 B2 | 2/2008 | Chan et al. | |
| 7,336,597 B2 | 2/2008 | Maltsev et al. | |
| 7,366,142 B2 | 4/2008 | Ngai et al. | |
| 7,522,556 B2 | 4/2009 | Hanna et al. | |
| 7,936,711 B2* | 5/2011 | Kilfoyle et al. | 370/328 |
| 2002/0028655 A1 | 3/2002 | Rosener | |
| 2003/0046891 A1* | 3/2003 | Colada et al. | 52/518 |
| 2003/0123401 A1 | 7/2003 | Dean | |
| 2004/0131027 A1 | 7/2004 | Lokio | |
| 2004/0156097 A1 | 8/2004 | Roper | |
| 2005/0118949 A1 | 6/2005 | Allen | |
| 2005/0176368 A1 | 8/2005 | Young | |
| 2005/0272367 A1 | 12/2005 | Rodgers | |
| 2006/0068828 A1 | 3/2006 | Eckl | |
| 2006/0203757 A1 | 9/2006 | Young | |
| 2007/0188235 A1 | 8/2007 | Dean | |
| 2007/0202826 A1 | 8/2007 | Dean | |
| 2008/0062906 A1 | 3/2008 | Baker | |
| 2008/0240024 A1 | 10/2008 | Rao | |
| 2010/0208775 A1* | 8/2010 | Weill | 375/150 |

FOREIGN PATENT DOCUMENTS

| | | |
|---|---|---|
| WO | WO0036761 | 6/2000 |
| WO | WO0074290 | 7/2000 |
| WO | WO2007098313 | 8/2007 |

OTHER PUBLICATIONS

Six-page Invitation to Pay Additional Fees and, Where Applicable, Protest Fee, including Partial Search Report mailed Aug. 16, 2010 for PCT/US2010/028469.

* cited by examiner

UPLINK SIGNAL DETECTION IN RF REPEATERS

FIELD OF THE INVENTION

The present invention is directed generally to repeaters or signal repeating devices for wireless communications, and more particularly to an apparatus and method for detecting spread spectrum signals.

BACKGROUND OF THE INVENTION

In existing wireless technologies, signal repeating devices, or "repeaters" are used to extend the coverage of the overall wireless system. For example, often such wireless or cellular systems consist of a plurality of base stations that communicate with each other in an overlapping fashion, and operate to provide a defined signal coverage area for user equipment ("UE"), such as a cell phone or other wireless device. In such coverage areas, there are often smaller, more remote areas that have very low signal reception, such as areas within buildings or areas that are otherwise obstructed. Rather than implementing another costly and large base station to provide coverage to such low signal areas, signal repeating devices or repeaters are utilized.

Figure 1:
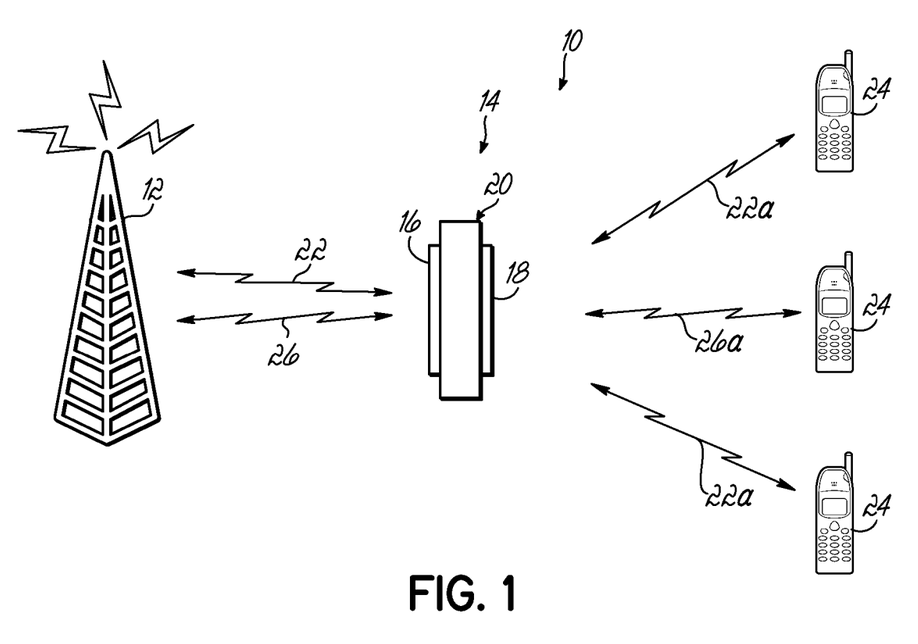
FIG. 1 is a schematic diagram of a repeater utilized within a wireless system for incorporating an embodiment of the present invention.

A repeater essentially has a donor antenna that is in communication with one or more base stations. The repeater receives downlink signals from the base station, processes and amplifies those signals, and then transmits those signals through a coverage antenna into the remote area that otherwise has low signal reception or low signal power. For example, referring to FIG. 1, a portion of a wireless communications system 10 might include a base station 12 that communicates with a repeater 14 having a donor antenna 16, a coverage antenna 18, and processing electronics 20 that are configured to process and amplify the repeated signal. Accordingly, downlink wireless signals 22 from the base station 12 are received by the donor antenna 16 of the repeater 14. The signals are then amplified and repeated to be transmitted through the coverage antenna 18 as downlink signals 22a. The repeated downlink signals 22a are transmitted into the remote area and are received by the UE that may include one or more wireless communication devices, such as cell phones 24, as show in FIG. 1. Similarly, in an uplink direction, as indicated by reference numerals 26 and 26a, the UE devices 24 communicate signals back to the coverage antenna 18, and the repeated signal 26 is then transmitted as an uplink signal back to the base station 12. As would be readily understood by a person of ordinary skill in the art, such repeater devices 14 can take many different forms.

One particular performance characteristic of a repeater is the gain of the repeater, or the amount of amplification that the repeater provides in the repeated signal. In many applications for a repeater within a wireless system, it is desirable to vary the gain of the repeater based upon certain signal transmission parameters. For example, in a spread spectrum system, such as a CDMA system that utilizes spread spectrum signal traffic, it may be desirable to lower the gain of the repeater based upon the absence of any spread spectrum signal traffic through the repeater. Otherwise, a repeater that continuously operates at a high gain may very likely increase the interference level within the wireless coverage area. Spread spectrum signals appear generally noise-like in structure, and are thus, susceptible to the overall noise figure within the wireless system. The overall network capacity within a spread spectrum communication network is a function of the interference or noise level within that network. As such, it is desirable to automatically adjust the gain, and specifically lower the gain when there is no signal traffic through the repeater. Conversely, when signal traffic is present, it would be desirable to increase the repeater gain.

There is an inherently difficult problem in automatically controlling the gain of a repeater within a spread spectrum system based upon the existence or absence of the spread spectrum signal. In spread spectrum technology, the signals are subject to spreading codes, which are often called "Pseudo Noise" ("PN") codes. Because of the noise-like structure of the signals, they are difficult to detect at a repeater when the spreading codes are not known. As such, it becomes difficult to automatically adjust the gain of a repeater based upon such signal detection.

Accordingly, there exists a need in the art to provide gain control within a repeater, and particularly to provide gain control in a network utilizing spread spectrum signals.

SUMMARY OF THE INVENTION

A method is provided for detecting an IS-95 signal without knowledge of a spreading code for the IS-95 signal. A received baseband signal is rotated through a plurality of phase-shifts. For each of the phase-shifted baseband signals, an in-phase component or a quadrature component of the phase-shifted baseband signal is realigned. The in-phase and quadrature components are then multiplied by a PN short code, derived from GPS time of day, to partially despread the components. The partially despread in-phase and quadrature components are multiplied and integrated over time. The integrated components are compared to a threshold value, and in response to exceeding the threshold value, the received baseband signal is identified as an IS-95 signal.

In an exemplary implementation of detecting IS-95 signals, a method is provided for repeating signals between multiple sources. Signals repeated between the multiple sources are transceived with a donor antenna and a coverage antenna. The repeated signals are amplified between the antennas with an amplification circuit having a variable gain. Uplink signals are downconverted to complex baseband signals. The phase of the baseband signals is rotated through a plurality of phase shifts. Each phase shifted baseband signal is multiplied by a PN short code derived from GPS time of day. The gain may then be varied based upon the multiplied baseband signal exceeding a threshold indicating the presence of an IS-95 spread spectrum signal.

In another exemplary implementation for detecting IS-95 signals, a repeater is provided for repeating signals between multiple sources. The repeater include a donor antenna and a coverage antenna for transceiving signals that are repeated between the multiple sources. An amplification circuit is positioned between the donor and coverage antennas for amplifying the repeated signals. The amplification circuit is configured for a variable gain. A detection circuit is configured to obtain a PN short code derived from GPS time of day for an uplink signal received by the repeater. The detection circuit is operable to downconvert the uplink signal to a complex baseband signal and to rotate the baseband signal through a plurality of phase shifts. The detection circuit further multiplies each of the phase shifted baseband signals by the PN short code to partially despread the signal. An amplification circuit may then vary its gain based upon the multiplied baseband signal exceeding a threshold value, indicating the presence or absence of a spread spectrum signal.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the present invention are directed to a system and method for automatic gain control of a repeater utilizing detection of a spread spectrum signal to trigger the gain control. Embodiments provide a method for detecting the existence of spread spectrum wireless signals without the knowledge of the spreading codes used for transmission. The detection method employed in embodiments of the invention exploits a known modulation structure of IS-95 and its relationship to GPS time of day in order to accurately detect the existence of IS-95 signals without the knowledge of the underlying spreading codes.

Figure 2:
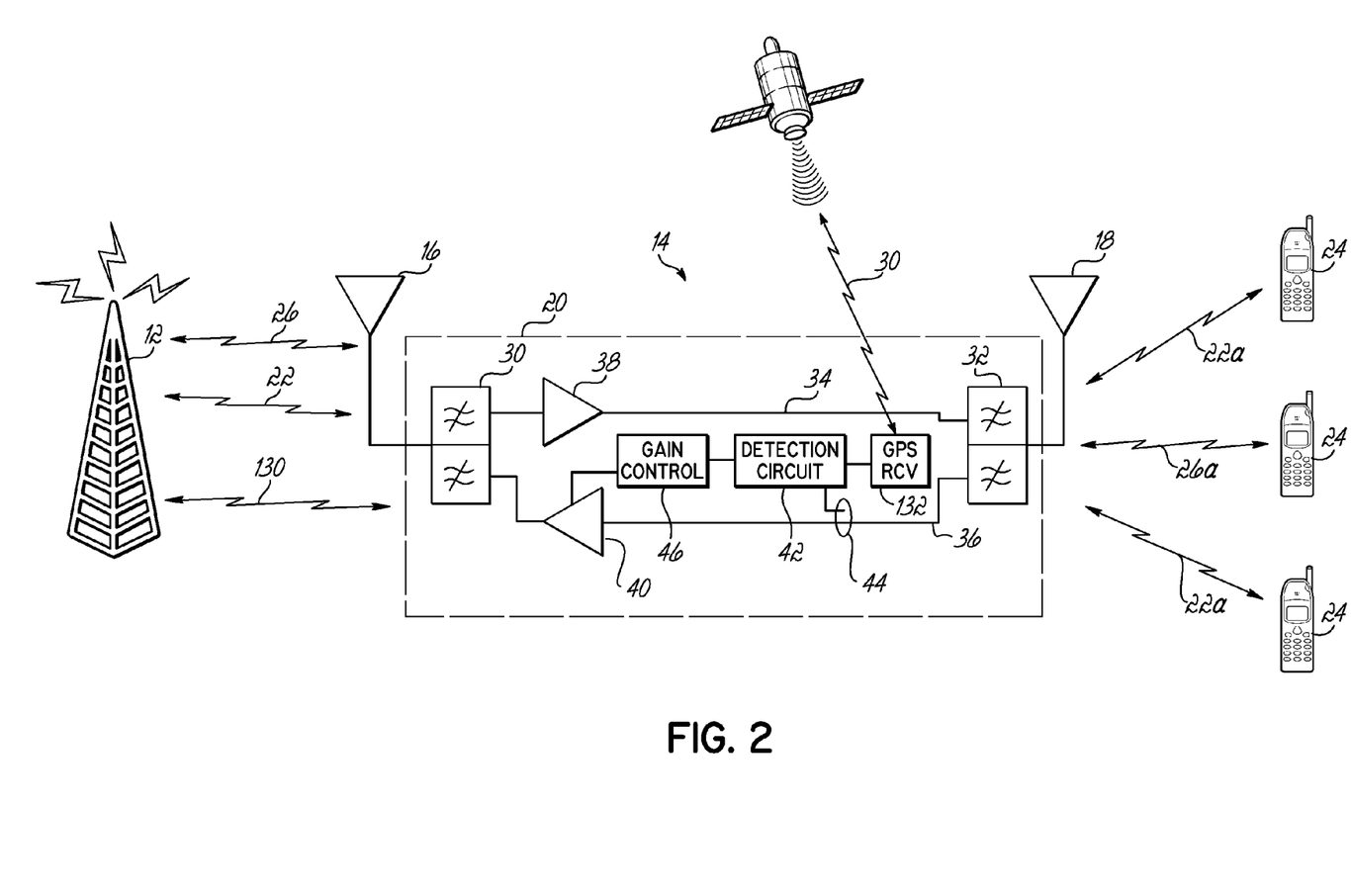
FIG. 2 is a circuit block diagram of a repeater incorporating one embodiment of the present invention.

The IS-95 standard uses a unique complex quadrature modulation technique for all of its physical channels for uplink transmissions from user equipment ("UE") 24 to a base station ("BTS") 12 as illustrated in FIG. 2. Using quadrature modulation, in phase and quadrature components of the transmission circuitry carry the same data but are phase shifted from one another. The detection method exploits this underlying correlation of the quadrature modulation process to detect the presence of the signal buried in noise. An uplink signal 26a transmitted from the UE 24 may be received at detection circuitry 42, such as in a repeater 14, at a suitable coupling point 44 and may be downconverted from an RF signal to a complex baseband signal using a heterodyne, super heterodyne or a direct conversion receiver as well known in the art. For example as shown in FIG. 2, antennas 16 and 18 feed into respective duplexers 30, 32 to provide frequency isolation between a downlink path 34 and an uplink path 36. In both the downlink and uplink paths 34, 36, the signals are amplified by one or more amplifiers or amplifier components/ circuits illustrated schematically as components 38 and 40. Repeater 14 repeats signals between multiple signal sources, such as BTS 12 and UE 24. Like reference numerals are utilized in FIG. 2 for those components also shown in FIG. 1.

Repeater 14, and particularly the process electronics 20 of the repeater, includes a detection circuit 42 that couples off a portion of the uplink signal 36 at a suitable coupling point 44 using an appropriate coupler. The detection circuit 42 is configured for isolating and reviewing the uplink signal by rotating the in-phase and quadrature components of the complex baseband signal through different phase-shift rotations and de-spreading by a PN short code in order to detect the existence of a spread spectrum signal within the uplink traffic 36. A gain control circuit 46 is operably coupled to each of the uplink amplifier 40 for varying the gain of the uplink amplifier, and thus, varying the uplink gain of the repeater 14 based upon the rotating and despreading process and the detection of a spread spectrum signal, as provided by the detection circuit 42. The detection circuit 42 and gain control circuit 46 may be implemented in various different ways, such as utilizing a processor and suitable frequency up-conversion and down-conversion circuitry for processing the uplink signals 36 to implement suitable modulation/demodulation techniques as discussed herein.

The PN short code used by the UE to spread the spectrum of the modulated signal is not unique to each UE, but rather is synchronized with GPS time of day derived from a GPS signal 30. Therefore, knowledge of GPS time is needed in order to approximate the phase of the PN short codes. With proper time alignment and phase shift, the two components of the complex baseband signal may exhibit a significant correlation peak if an IS-95 signal is present, and thus, gain of the repeater may be adjusted accordingly with gain control circuitry 46 in the repeater 14.

Figure 3:
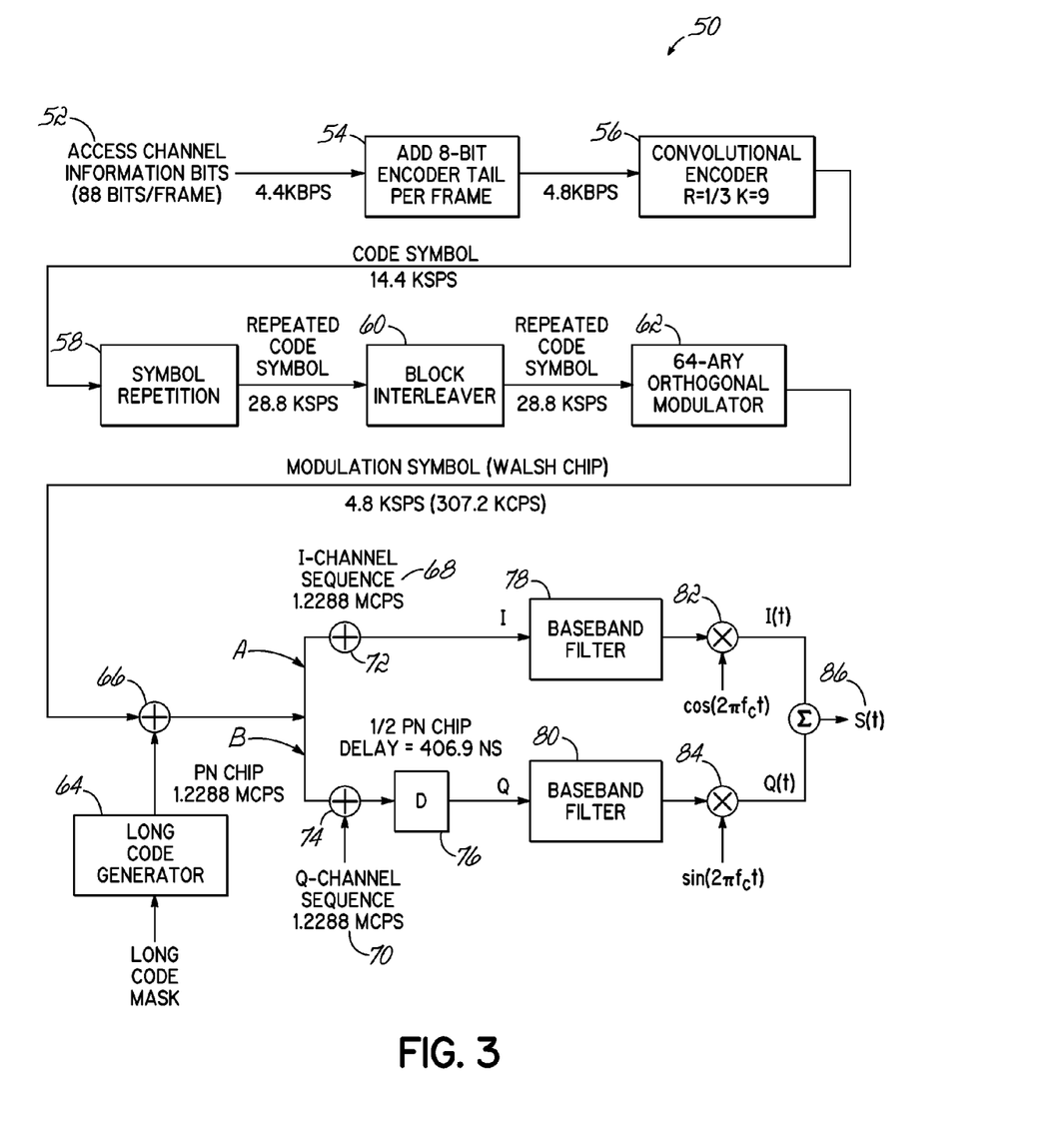
FIG. 3 is a block diagram illustrating IS-95 modulation for an uplink channel.

In an exemplary embodiment illustrated in the block diagram of a reverse access channel 50 in FIG. 3, uplink signals 26a from a UE 24 arrive at access channel 50 as information bits 52. The information bits are passed through forward error correction blocks, rate matching blocks, and interleaving blocks, shown in FIG. 3, 54-60, as would be understood by one of ordinary skill in the art. The signals are multiplexed with a 64-ary Walsh code at 62 so that signals from multiple UEs 24 remain mutually orthogonal. The modulated signal is spread using the long code from the long code generator 64 by a logic XORing function using appropriate logic circuitry at a point 66. The resulting spread signal waveform is the same at points "A" and "B" in FIG. 3, which represents the signal waveforms for the in-phase ("I") and quadrature ("Q") components of the complex baseband signal. At these two points the spread signal is broken out into two streams or branches by further spreading the in-phase and quadrature signals with two unique PN sequences, the I 68 and Q 70 PN short codes. Signal spreading is again accomplished with logic XORing functions using appropriate logic circuitry at points 72, 74. Following this, a ½ PN chip delay is introduced into the Q branch at 76 by appropriate hardware, in some embodiments, in order to create quadrature diversity through Offset Quadrature Phase Shift Keying ("OQPSK") modulation, which shifts the in-phase and quadrature components such that the in-phase and quadrature components will not change at the same time, thus minimizing large amplitude fluctuations. In other embodiments, realignments other than ½ PN chip may also be used for advances or delays to either the in-phase or quadrature components. Lastly, the I and Q branches are filtered with baseband filters 78, 80 and mixed onto the carrier wave at points 82, 84 for transmission by appropriate mixing circuitry. These signals are summed resulting in an IS-95 signal 80, which may then be transmitted to the BTS 12 as an uplink signal.

Because GPS time is known or can be readily retrieved by the repeater 14, it is possible for the repeater 14 to know the state of the I 68 and Q 70 PN short code sequences, since these code sequences only depend on GPS time, and not on user identity. Therefore a received signal may be projected onto each of the I 68 and Q 70 PN code sequences to partially despread incoming uplink signals. When the received signal time and carrier phase aligns with synthesized I and Q PN short code sequence replicas, the output energy of the detection circuit 42 will be maximized, indicating the presence of a IS-95 signal at some unique phase and time offset, and thus the uplink gain of the repeater 14 may be adjusted accordingly with the gain control 46 to amplify the uplink signal with amplifier 40 and in order to retransmit this signal. For example, if the output passes a certain threshold level indicating the presence of the signal from UE 24, then based on the signal strength the amplification may be increased. On the other hand, if the output is below some threshold, then the amplification may be turned off or lowered as desired by the user.

Figure 4:
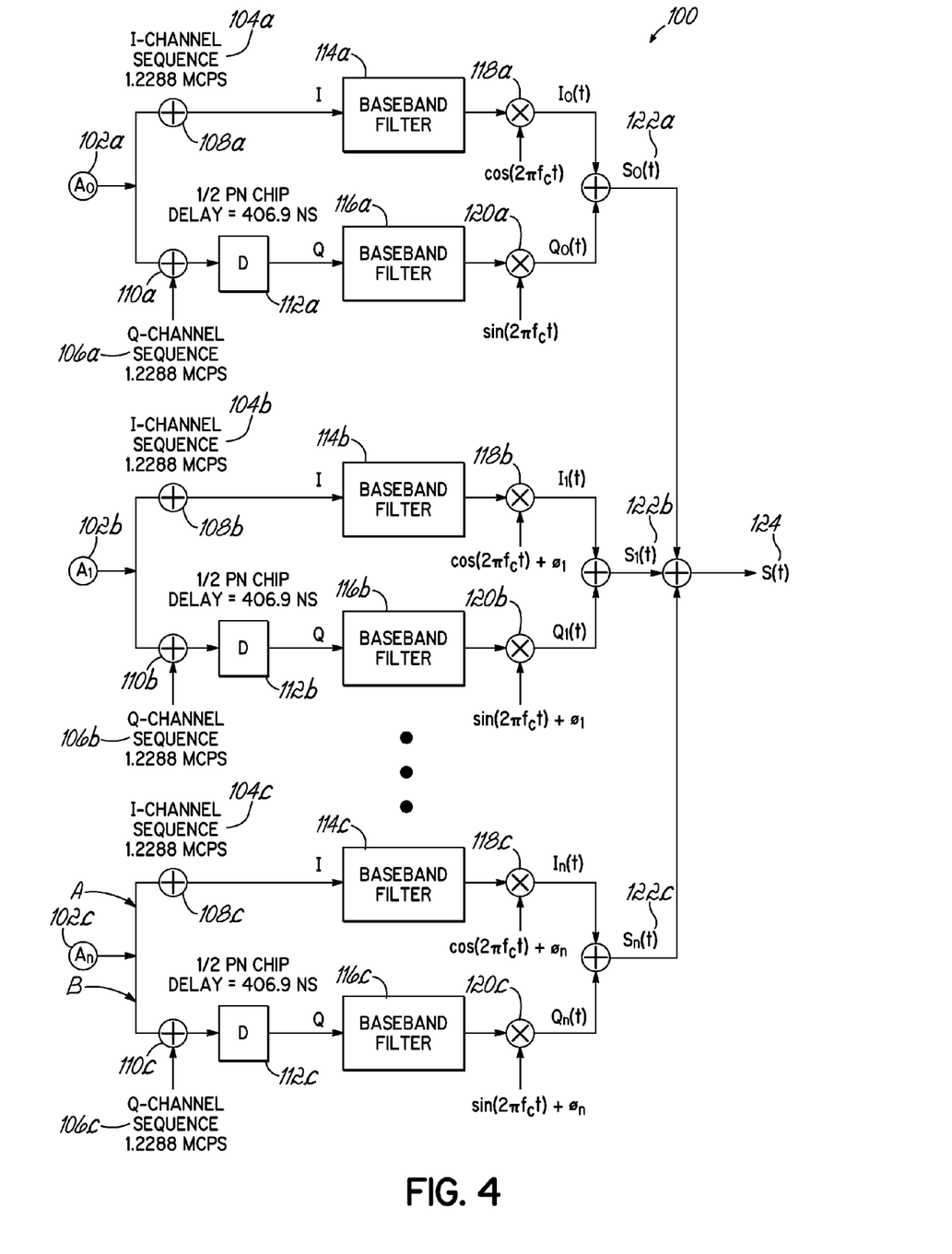
FIG. 4 is a block diagram illustrating IS-95 modulation for a traffic channel.

In another exemplary embodiment illustrated in the block diagram of a reverse traffic channel 100 in FIG. 4, modulated uplink signal wave forms 102a, 102b, 102c are similarly divided into in-phase ("I") and quadrature ("Q") branches of complex baseband signals. Signal waveforms 102a, 102b, 102c may include supplemental channels with the fundamental traffic channel, with each channel using a different carrier phase offset. Each of the modulated signal waveforms 102a-c are spread with a logic XOR function using appropriate logic circuitry at points 108a-c, 110a-c with I 104a-c and Q 106a-c PN short codes similar to the I 68 and Q 70 PN short codes in the embodiment in FIG. 3. The Q branch is then delayed, ½ PN chip, for example, at 112a-c with appropriate delay circuitry. As with the reverse access channel 50 in FIG. 3, both the I and Q branches are filtered using baseband filters 114a-c, 116a-c. The filtered signals are mixed onto a carrier wave by appropriate mixers at points 118a-c, 120a-c for transmission at different phases and summed. The resulting wave forms 122a-c are then combined into signal 124 and transmitted to as an IS-95 uplink signal to a BTS 12.

Referring again to FIG. 2, after transmission of the IS-95 uplink signals, at the repeater 14, the detection circuitry 42 acquires GPS time and tags the start time of the received RF uplink signal 26a. The GPS time may be acquired from either a downlink synchronization channel ("SCH") 130, or may be independently derived through a separate GPS receiver module 132 in the repeater 14. The PN short code sequences for the I and Q branches are generated from the GPS start time of the captured signal buffer.

Figure 5:
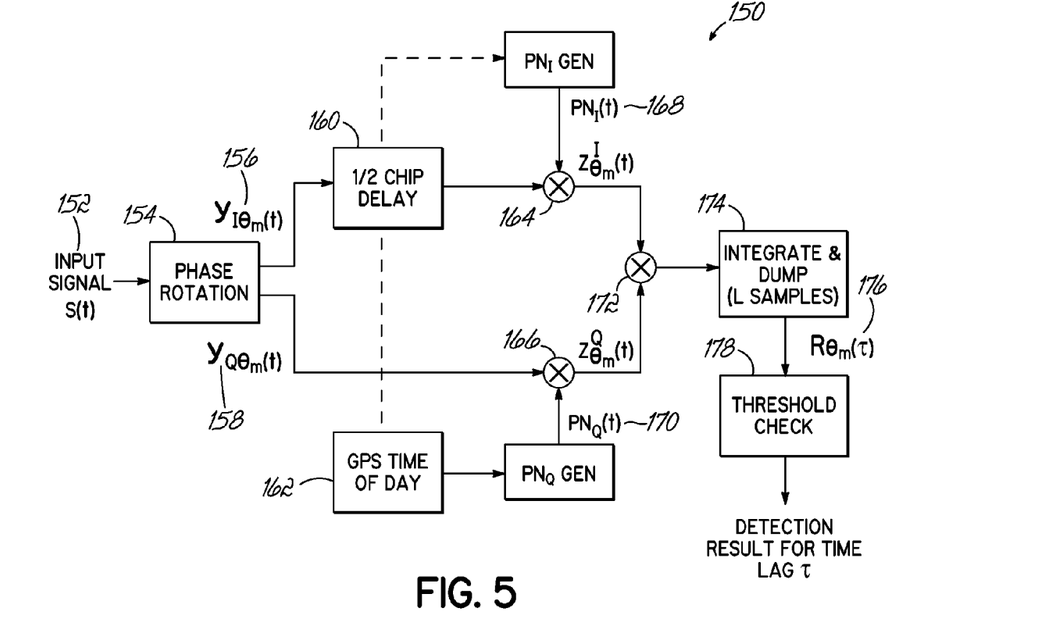
FIG. 5 is a block diagram illustrating the detection of the modulated signals of FIGS. 3 and 4.

As shown in FIG. 5, uplink signal collection is started at a time t. The collected uplink signal is down-converted to a complex baseband signal 152. The complex baseband signal is then rotated through a plurality of different phase-shifts at 154. The process of detection is repeated for each of the phase-shifted signals 156, 158 as shown in the block diagram of detection process 150 in FIG. 5. Multiple phases are examined for peak values to try to ensure that an actual signal is present. Additionally different peaks may be found at different phases indicating different signal strengths of the signals to be used in adjusting the uplink gains. The in-phase signal 156 of the complex base band signal is delayed by ½ PN chip at 160 with appropriate delay circuitry in order to re-align the in-phase and quadrature components or branches of the signal. One of ordinary skill in the art will realize that delays other than ½ PN chip may also be used but the delays should correlate to the delay of the transmitting UE. The signals 156, 158 on both branches of the complex baseband signal are multiplied by the corresponding I 168 and Q 170 PN short codes to partially despread the signals at points 164, 166, which are derived from the current approximate GPS time 162 t acquired above from either the downlink SCH 130 or GPS receiver module 132. The output from the branches $Z_{\theta_m}^I(t)$ and $Z_{\theta_m}^Q(t)$ are multiplied at 172 for a certain time length, then summed and squared at 174.

Because of propagation uncertainty between the UE 24 and receiver, as well as unknown time delays at the receiver, the I and Q PN short codes may not align exactly in time. Therefore, time alignment should also be searched in addition to carrier phase in order to accurately detect an IS-95 uplink signal. Consequently, the method set forth above may be repeated for all time delays within each phase. The time delays may preferably be in units of no less than ½ PN chip for best performance, although other delay intervals may also be used. For all different delays and phase shifts the result 176 is checked against a threshold value 178, which may be established as a function of the signal energy received.

The method set forth in the embodiments above is mathematically described as follows. Let the input signal=s(t). After phase rotation, where $\theta=\theta_m$, the signal can be written as:

$$y_{\theta_m}(t)=s(t)e^{-j\theta_m} \quad (1)$$

$y_{\theta_m}(t)$ describes the signal at time t, phase shifted $\theta_m$ radians, where $\theta_m$ is one of a plurality of possible phase-shift rotations. The signal may now be represented in terms of its in-phase and quadrature parts:

$$y_{I\theta_m}(t)=\text{Real}\{y_{\theta_m}(t)\}=\{s_I(t)\cos(\theta_m)-s_Q(t)\sin(\theta_m)\} \quad (2)$$

$$y_{Q\theta_m}(t)=\text{Imag}\{y_{\theta_m}(t)\}=\{s_Q(t)\cos(\theta_m)+s_I(t)\sin(\theta_m)\} \quad (3)$$

Next, the in-phase component $y_{I\theta_m}(t)$ is delayed by $$\frac{1}{2}PN \text{ chip}\left(\frac{T_C}{2}\right)$$

in order to re-align the in-phase and quadrature components that were offset at the time of transmission. The in-phase component is also multiplied by the I PN short code 168, $PN_I(t)$.

$$z_{\theta_m}^I(t) = y_{I\theta_m}\left(t-\frac{T_C}{2}\right)PN_I(t) = \quad (4)$$
$$\left\{s_I\left(t-\frac{T_C}{2}\right)\cos(\theta_m)PN_I(t) - s_Q\left(t-\frac{T_C}{2}\right)\sin(\theta_m)PN_I(t)\right\}$$

Similarly, the quadrature component is multiplied by the Q PN short code 170, $PN_Q(t)$.

$$z_{\theta_m}^Q(t) = y_{Q\theta_m}(t)PN_Q(t) = \{s_Q(t)\cos(\theta_m)PN_Q(t) + s_I(t)\sin(\theta_m)PN_Q(t)\} \quad (5)$$

The PN short code phase state is determined by the known GPS time of day 162. $PN_I(t)$ 168 is the I-phase PN generator sequence output at GPS time t and $PN_Q(t)$ 170 is the Q-phase PN generator sequence output at GPS time t.

Both the in-phase and quadrature components are then multiplied together, summed and squared as follows for all time durations L:

$$R_{\theta_m}(\tau) = \left\|\sum_{t=0}^{L-1}\{z_{\tau,\theta_m}^I(t-\tau)\}\{z_{\tau,\theta_m}^Q(t-\tau)\}\right\|^2 \quad (6)$$

The value of L may be determined by the desired integration time, or signal sequence length. Therefore, the embodiments of the invention intend to maximize the solution of $R_{\theta_m}(\tau)$ 176 for the values of carrier phase rotations θ and time lags τ.

In operation, in some embodiments, the traffic ("TCH") 100 and the random access channel ("RACH") 50 are monitored to detect spread spectrum uplink activity. Either of these channels may be used for UE uplink transmission 26a to the BTS 12. The detection process for RACH activity, for example, is generally monitored at every integer multiple of the 20 ms access boundaries, per the IS-95 specification, though other time multiples may also be used. The PN short codes used in the detection process may be generated on the fly using linear feedback shift registers in the detection circuit 42 in some embodiments, or may be pre-computed and stored in a memory in other embodiments.

As set forth above, the complex baseband signal is phase rotated through a plurality of discrete phase-shift values starting from zero and generally using a fixed step size. As would be appreciated by one of ordinary skill in the art, a smaller step size would likely result in better detection performance; however, the computational load due to this small step size may be significant. In embodiments where computation power is available, smaller step sizes may be used. If computational load is a concern, it has been determined that an adequate performance may be achieved by phase rotating the complex signal at discrete phase values with a step size $\pi/8$, i.e. steps at $0, \pi/8, \pi/4, 3\pi/8, \pi/2, 5\pi/8, 3\pi/4, 7\pi/8$, and $\pi$. A single value is obtained for each of the phase values, and each of the phases is evaluated to determine the maximum magnitude among all of the phase values.

Figure 6:
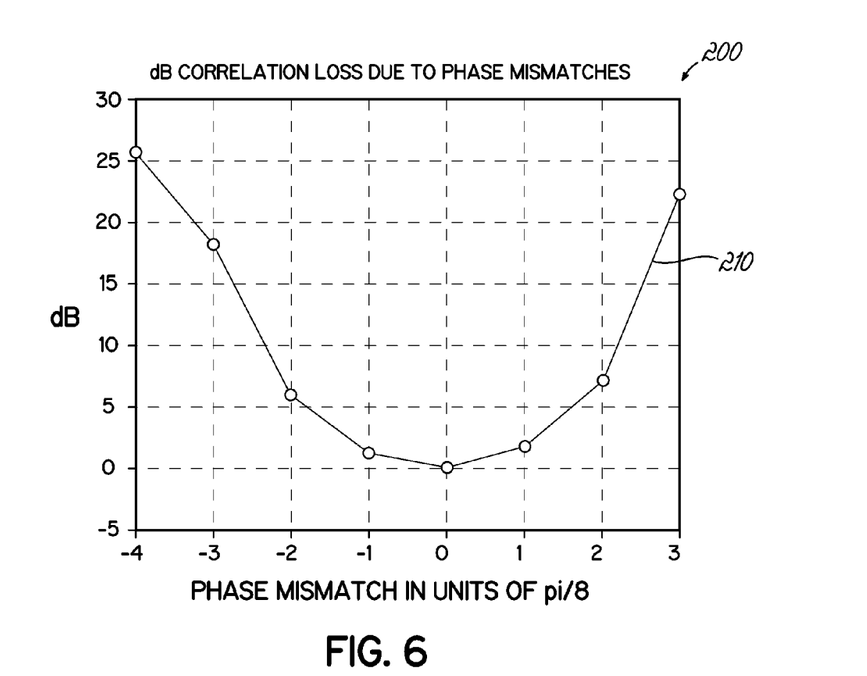
FIG. 6 is a graph of correlation loss v. phase offset for the complex baseband signal.

Graph 200 in FIG. 6 illustrates the dB correlation loss as a function of the phase step size. This analysis indicates that using a phase step size of $\pi/8$ may result in a maximum loss of approximately 0.8 dB and on average about 0.4 dB. This is concluded by assuming that the actual carrier phase of the received signal is off by exactly one half of the step size, or $\pi/16$. If the step size were to be increased to $\pi/4$, the worse case correlation loss increases to approximately 3.5 dB with an average loss of about 1.75 dB, which may be unacceptably high. However, an advantage of using a lower number of phase rotation steps is that it reduces the computational load because fewer correlations would need to be performed. But, the disadvantage of using a lower number of steps is that in order to make up for the loss and to be able to maintain the same detection performance, the correlation sequence length would need to be increased, which increases computational load.

The selection of the required integration time L, in equation (6) is a function of the needed processing gain in order to achieve reliable detection. Analysis and simulation results have indicated that to achieve good performance of detection at −14 dB C/I (carrier to interference ratio), 8192 chips are needed, though for other embodiments and other C/I ratios that may be acceptable, more or fewer chips may be used. More thorough analysis may be performed to quantitatively determine the probability of detection and false alarms as a function of the processing gain, which is a well-known exercise for those of ordinary skill in the art.

$R_{\theta_m}(t)$ 176 in equation (6) is checked against a threshold at 178 to determine the existence of an IS-95 spread spectrum signal. The threshold is generally determined from theoretical calculations and adjusted as necessary through the use of simulations, lab testing, and field testing. An integration length for the time lags L should be optimally chosen to strike a balance between performance and computational load. The threshold should be carefully chosen so that probability of detection and false alarm meets the requirements of the system design.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for detecting an IS-95 signal without knowledge of a spreading code for the IS-95 signal, the method comprising:
    rotating a received baseband signal through a plurality of phase-shifts;
    for each phase-shifted baseband signal:
        realigning an in-phase component or a quadrature component of the phase-shifted baseband signal;
        multiplying the in-phase and quadrature components by a PN short code to partially despread the components;
        multiplying the partially despread in-phase and quadrature components; and
        integrating the multiplied partially despread in-phase and quadrature components;
    comparing the integrated despread in-phase and quadrature components to a threshold value; and
    in response to exceeding the threshold value, identifying the received baseband signal as an IS-95 signal.

2. The method of claim 1, wherein the PN short code is derived from a current GPS time of day.

3. The method of claim 1, further comprising:
    obtaining an integrated value for each of the phase-shifts in the plurality of phase-shifts; and
    evaluating each phase shift to determine a maximum magnitude of the integrated value among each of the plurality of phase shifts.

4. The method of claim 1, wherein multiplying the in-phase and quadrature components by the PN short code comprises:
    multiplying the in-phase component by a first PN short code to partially despread the in-phase component; and
    multiplying the quadrature component by a second PN short code to partially despread the quadrature component.

5. The method of claim 1, further comprising:
    determining at least one time delay from the first and second PN short codes;
    for each time delay in each phase-shifted baseband signal:
        realigning an in-phase component or a quadrature component of the phase-shifted baseband signal;
        multiplying the in-phase component and the quadrature component by the PN short code to partially despread components;
        multiplying the partially despread in-phase and quadrature components; and
        integrating the multiplied partially despread in-phase and quadrature components.

6. A method for repeating signals between multiple sources, the method comprising:
    transceiving signals repeated between the multiple sources with a donor antenna and a coverage antenna;

amplifying the repeated signals between the antennas with an amplification circuit having a variable gain;
downconverting an uplink signal to a complex baseband signal;
rotating a phase of the baseband signal to a phase shift of a plurality of phase shifts;
multiplying the phase shifted baseband signal by a PN short code derived from GPS time of day; and
varying the gain based upon the multiplied baseband signal exceeding a threshold indicating the presence of a spread spectrum signal.

7. The method of claim 6, further comprising:
increasing the gain when the multiplied baseband signal exceeds the threshold indicating the presence of a spread spectrum signal.

8. The method of claim 6, further comprising:
decreasing the gain when the multiplied baseband signal does not exceed the threshold indicating the absence of a spread spectrum signal.

9. The method of claim 6, further comprising:
realigning an in-phase component or a quadrature component of the complex baseband signal;
multiplying the in-phase component by an in-phase PN short code derived from GPS time of day;
multiplying the quadrature component of the complex baseband signal by a quadrature PN short code derived from GPS time of day; and
multiplying the in-phase and quadrature components.

10. The method of claim 9, further comprising:
summing and squaring the multiplied in-phase and quadrature components over a plurality of time lags; and
comparing the summed and squared value to the threshold.

11. The method of claim 6, wherein the PN short code is generated on the fly using linear feedback shift registers.

12. The method of claim 6, wherein the PN short code is pre-computed and stored in a memory.

13. The method of claim 6, further comprising:
monitoring a reverse access channel or a reverse traffic channel to detect uplink activity at predetermined multiples.

14. A repeater for repeating signals between multiple sources, the repeater comprising:
a donor antenna and a coverage antenna for transceiving signals that are repeated between the multiple sources;
an amplification circuit positioned between the donor and coverage antennas for amplifying the repeated signals, the amplification circuit having a variable gain;
a detection circuit configured for obtaining a PN short code derived from GPS time of day for an uplink signal to the repeater and operable for downconverting the uplink signal to a complex baseband signal, rotating a phase of the baseband signal to a phase shift of a plurality of phase shifts, and multiplying the phase shifted baseband signal by the PN short code; and
the amplification circuit varying the gain based upon the multiplied baseband signal exceeding a threshold indicating the presence or absence of a spread spectrum signal.

15. The repeater of claim 14, wherein the amplification circuit increases the gain when the multiplied baseband signal exceeds the threshold indicating the presence of a spread spectrum signal.

16. The repeater of claim 14, wherein the amplification circuit decreases the gain when the multiplied baseband signal does not exceed the threshold indicating the absence of a spread spectrum signal.

17. The repeater of claim 14, wherein the detection circuit is further operable to realign an in-phase component or a quadrature component of the complex baseband signal, multiply the in-phase component by an in-phase PN short code derived from GPS time of day, multiply the quadrature component of the complex baseband signal by a quadrature PN short code derived from GPS time of day, and multiply the in-phase and quadrature components.

18. The repeater of claim 14, further comprising:
a downlink synchronization channel, wherein the GPS time of day is acquired from the downlink synchronization channel.

19. The repeater of claim 14, further comprising:
a GPS receiver module, wherein the GPS time of day is derived through the GPS receiver module.

20. The repeater of claim 14, further comprising:
a plurality of linear feedback shift registers, wherein the PN short code is generated on the fly using the shift registers.

* * * * *